(No Model.) 3 Sheets—Sheet 1.
A. MIEBACH.
APPARATUS FOR AUTOMATICALLY MEASURING THE DIAMETER OF ARTICLES BEING TURNED.
No. 496,272. Patented Apr. 25, 1893.
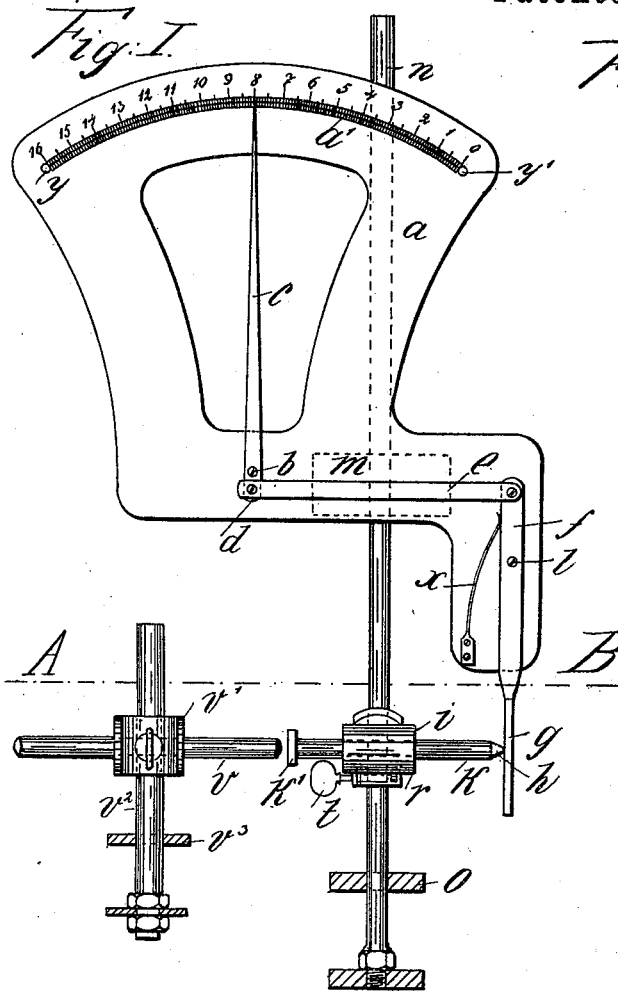
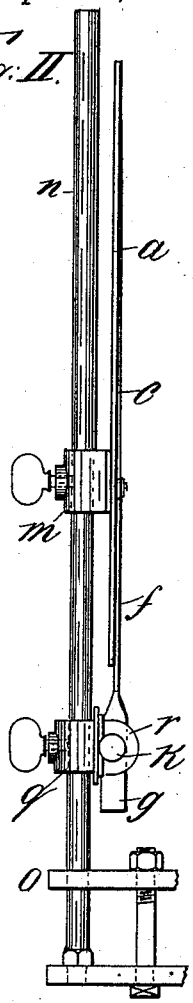
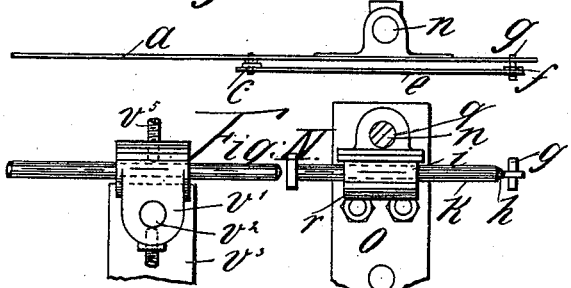
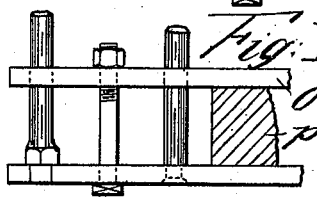
Witnesses.
J. H. Daly
Robert Everett
Inventor:
August Miebach.
By James L. Norris.
Atty.
THE NORRIS PETERS CO., PHOTO-LITHO., WASHINGTON, D. C.

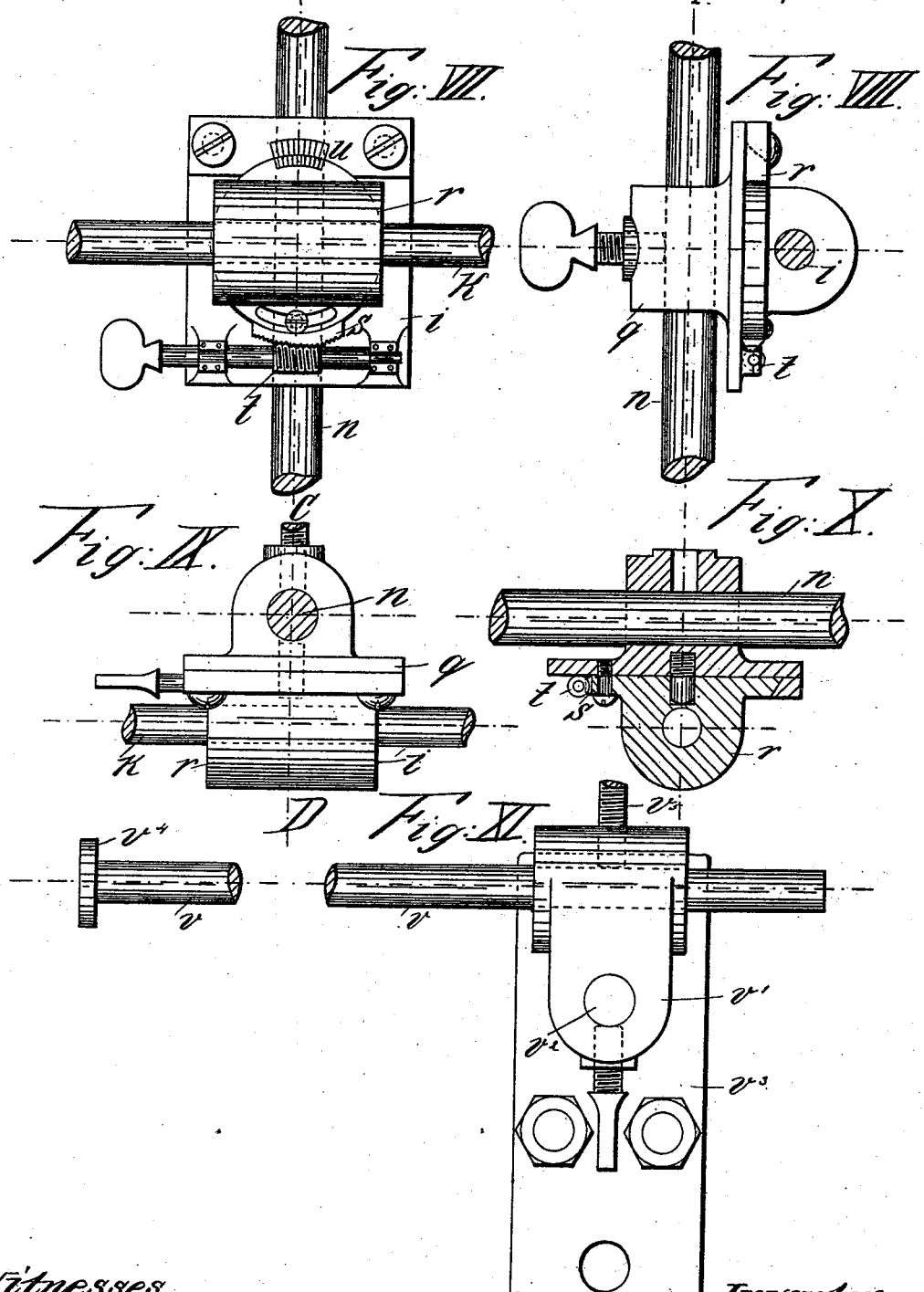

(No Model.) 3 Sheets—Sheet 3.
A. MIEBACH.
APPARATUS FOR AUTOMATICALLY MEASURING THE DIAMETER OF ARTICLES BEING TURNED.
No. 496,272. Patented Apr. 25, 1893.
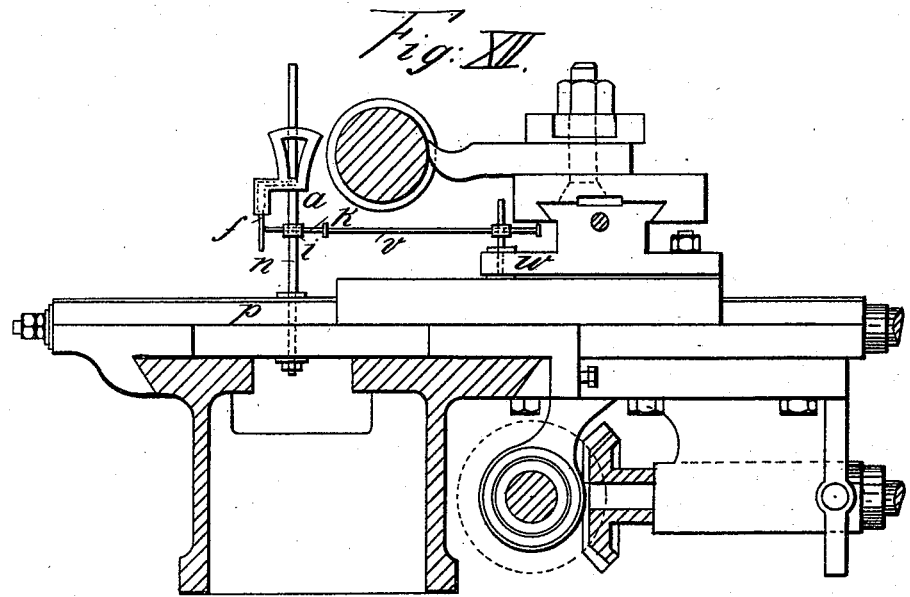
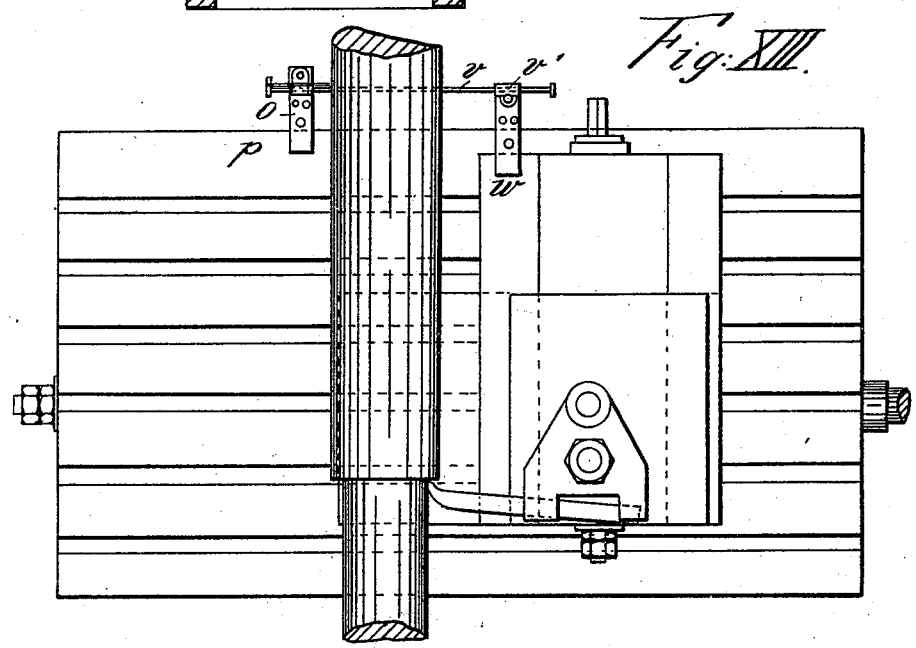
Witnesses.
Inventor.
August Miebach.
By
Atty.

UNITED STATES PATENT OFFICE.

AUGUST MIEBACH, OF ERFURT, GERMANY.

APPARATUS FOR AUTOMATICALLY MEASURING THE DIAMETER OF ARTICLES BEING TURNED.

SPECIFICATION forming part of Letters Patent No. 496,272, dated April 25, 1893.

Application filed June 7, 1892. Serial No. 435,904. (No model.)

*To all whom it may concern:*

Be it known that I, AUGUST MIEBACH, turner, a subject of the King of Prussia, residing at Erfurt, in the Kingdom of Prussia and German Empire, have invented new and useful Improvements in Apparatus for Automatically Measuring the External or Internal Diameter of Articles that are being Turned, Bored, or Milled, of which the following is a specification.

My invention relates to improvements in apparatus for automatically measuring the external or internal diameter of articles that are being turned, bored or milled and is adapted to be employed on lathes, milling machines, boring machines and similar machine tools for treating metal, wood or other materials by means of a chisel or having a chisel-like action. The said apparatus is designed to indicate to the workman in an automatic manner the measurement of the turning or boring, according to a given initial measurement (caliber) found by a preliminary turning or boring operation. The apparatus is also designed to prevent the article to be treated from being machined beyond the desired extent. This is effected by the apparatus preventing the support of the cutting tool from moving too near to the article.

The apparatus acts automatically and controls automatically the work performed by the cutting tool.

The apparatus acts as follows:—The frame of the measuring apparatus is fixed by means of screws, clamping plates or in any other suitable manner on the lower supporting carriage which effects solely the longitudinal movement (along the bed) while a pressure rod is connected adjustably and so as to be capable of being fixed, with the carriage of the cutting tool that moves toward the work that is being turned or bored said pressure rod acting through the medium of suitable multiplying lever mechanism upon the pointer of the measuring apparatus. If now by way of example an article is to be reduced in diameter by a determined amount say four millimeters, the pressure rod is set in such a manner, that the pointer of the apparatus shall point to the same extent away from the zero point of the scale, while the tool is situated close up to the work to be turned. The pressure rod is then firmly fixed and consequently through the medium of the measuring apparatus allows the tool carriage to move forward only to the exact extent indicated by the pointer.

The apparatus is illustrated in construction and in use in the accompanying drawings.

Figure I illustrates the same in front elevation. Fig. II is a side elevation and Fig. III is a plan. Fig. IV is a horizontal section on the line $ab$ Fig. I. Figs. V and VI show in front elevation and plan the clamping plates which serve for fixing the apparatus to the lower support. Figs. VII, VIII, IX, and X illustrate the adjustable cross sleeve for guiding the measuring rod of which Fig. VII is a front elevation, Fig. VIII a side elevation, Fig. IX a plan, and Fig. X a vertical section on the line $c. d.$ Fig. IX. Fig. XI is a plan of the sleeve and clamping plate for guiding the pressure rod. Figs. XII and XIII illustrate the arrangement of the apparatus on the carriage or support of a lathe, in front elevation and plan.

The measuring apparatus is an instrument of precision, as it indicates the amount of the turning, milling or boring on a larger scale on a divided arc. On the arc or scale $a'$ of the frame $a$ there moves a pointer $c$ which is pivoted at $b$ and to the lower arm $d$ of which there is jointed the connecting rod $e$ (Figs. I-IV.) The latter is connected with a two armed lever $f$ against whose longer lower arm $g$. abuts the measuring rod $k$ which is provided with a center punch point $h$ and is guided in the adjustable cross sleeve $i$. Since in turning or boring the amount of the turning has the diameter as the unit and the apparatus indicates this amount on one side only, that is to say for the radius, the lever arms of the two armed lever $f$ are made such, and the scale $a'$ is provided with divisions such that it indicates the amount of turning having the diameter as a unit. The frame, which carries the pivot $d$ of the pointer $c$ and the pivot $l$ of the lever $f$ is adjustably fixed on the standard $n$, by means of a screw sleeve $m$. The standard $n$ is fixed to the lower support $p$ of the lathe or machine tool by means of clamping plate $o$, screws or other means.

The rod $n$ also carries the cross sleeve $i$, see Figs. I–IV. The latter consists of the rear vertically movable casing $q$ and the forward casing $r$ which carries the measuring rod $k$ and is capable of adjustment with respect to the casing $q$ by means of adjusting mechanism (wheel $s$ and worm $t$) or by other means, so that the inclination of the rod $k$ toward the lever $g$ can be varied for the purpose of correcting if required the amount of travel of the lever $g$. A vernier $u$ can be provided for accurately adjusting the casing $r$ on the casing $q$. Against the head $k'$ of the measuring rod $k$ there acts a pressure rod $v$ which is movable in the casing $v'$ and can be fixed by means of a set screw $v^5$. The casing $v'$ is mounted on the vertical rod $v^2$ which is connected by means of clamping plates $v^3$, screws or other connecting means, with the tool carriage $w$ of the machine tool, see Figs. XII and XIII.

The rod $v$ is for the purpose of more convenient and easy adjustment formed at its rear end with a head $v^4$ and it could similarly to the measuring rod be provided on its surface with a divided scale.

A spring $x$ pressing against the lever $f$ or arranged in any other way, serves to bring the pointer automatically to the highest division of the scale $a'$. Stop pins $y$ and $y'$ limit the amount of travel of the pointer $c$.

The mounting and use of the apparatus are as follows:—The measuring apparatus is with its frame $a$ fixed on the lower supporting carriage of the lathe milling or boring machine, while the rod $v$. is fixed to the tool carriage by means of the clamping plate $v^2$. The adjustment of the pressure rod $v$ of the frame $a$ and of the cross sleeve $i$, is effected by placing $v$ opposite to the head $k'$ of the measuring rod $k$, the center-punch-point $h$ entering a center hole provided in the lever end $g$. A small shoulder is first turned on or in the article to be turned or bored, if such a shoulder does not already exist and its thickness is measured. The diameter of this shoulder enables the turner to determine the amount by which the article to be turned must be diminished in diameter or the article to be bored is to be widened. For example let this amount be assumed to be four millimeters. Then the workman advances the tool carriage until the point of the cutting tool just touches the article to be turned; then by means of the screw $v^5$ he sets the rod $v$ in such a manner that as it bears against the head $k'$ of the center punch rod $k$ it rotates the lever $f$ and with it the pointer $c$ to an extent such that the point of the pointer moves to the amount that is still to be turned down, that is to say four millimeters in the present example. Then the pressure rod $v$ is fixed by means of the said screw $v^5$. The workman can now by advancing the tool carriage, advance the tool toward the work and thus turn down the work to the extent indicated by the scale measurement fixed upon (taking the diameter as the unit). The pressure rod $v$ mounted on the tool carriage $w$ advances also with the latter, and presses by the medium of the measuring rod $k$ the pointer to the zero point of the scale. The workman can take a cut in one or in more stages, while the pointer $c$ moves toward the zero point to an extent equal to the double thickness of the cut. When the measure fixed upon has been completely turned down, the pointer $c$ bears against the stop pin $y'$ at the zero point of the scale, and as the pointer is connected by the lever mechanism $g. f.$ and the rod $k. v$ with the tool carriage, the latter cannot be advanced any farther without using greater force.

When different calibers or diameters are to be turned the pointer need not be set for each caliber in such a manner that after reaching the same the pointer $c$ will strike against zero, but any desired adjustment of the pointer is sufficient, and it is then the office of the workman to follow the movement of the pointer over the scale $a'$ corresponding to the advance of the tool.

In order that the casing $m$ and the cross sleeve $i$ shall remain at the same distance from each other, they may both be rigidly connected together. The fact that the apparatus automatically indicates the amount of machining according to a turned or bored shoulder (caliber) renders calipers superfluous in turning, and the turning is thus rendered more exact; furthermore by using the apparatus a considerable amount of time is saved because the apparatus indicates automatically the variation in diameter and it is not necessary to throw the machine tool out of operation, for the purpose of accurately measuring the diameter. Finally a more accurate turning is insured by the transmission of the measurements on a larger scale.

What I claim as my invention, and desire to secure by Letters Patent, is—

1. The combination of a tool carriage $w$ having a pressure rod $v$, a frame $a$ having a scale $a'$, a pointer $c$ movable over the scale, transmitting levers connected with the pointer, and a movable measuring rod $k$ bearing against one of the transmitting levers and adapted to be moved by the pressure rod on the tool carriage, substantially as described.

2. In an apparatus for measuring the diameter of articles, the combination with a support or carriage $p$, of a frame $a$ having a scale $a'$, a pivoted pointer $c$, the pivotally connected transmitting levers $e$ and $f$ connected with the pointer, a sleeve carrying a movable measuring rod $k$ bearing against one of the transmitting levers, a casing $v'$ carrying a pressure rod $v$ adjustable to different fixed positions and acting against the movable measuring rod, and a tool carriage $w$ on which the casing carrying the pressure rod is mounted, substantially as described.

3. In an apparatus for measuring the diameter of articles, the combination with a support or carriage $p$, of a frame $a$ having a scale $a'$ provided with a zero stop-pin $y'$, a pivoted pointer $c$ adapted to strike said zero stop-pin, the pivotally connected transmitting levers $e$ and $f$ connected with the pointer, a sleeve $i$ carrying a movable measuring rod $k$ which bears against one of the transmitting levers, a casing $v'$ carrying a pressure rod $v$ which is adjustable to different fixed positions and acts against the movable measuring rod, and a tool carriage $w$ on which the casing carrying the pressure rod is mounted, substantially as described.

4. In an apparatus for measuring the diameter of articles, the combination with a support or carriage $p$, of a frame $a$ having a scale $a'$, a pointer $c$ movable over the scale, transmitting levers connected with the pointer, a rotatable sleeve $i$ carrying a movable measuring rod $k$ and adjustable for varying the inclination of said rod, a casing $v'$ carrying a pressure rod $v$ which acts against the movable measuring rod, and a tool carriage $w$ on which the casing carrying the pressure rod is mounted, substantially as described.

In testimony whereof I have hereunto set my hand and affixed my seal in presence of two subscribing witnesses.

AUGUST MIEBACH. [L. S.]

Witnesses:
 CARL BORNGRAEBER,
 HERMANN STRASSNER.